United States Patent [19]
Brennan

[11] 3,725,498
[45] Apr. 3, 1973

[54] RECYCLABLE LIQUID ALUMINUM CHLORIDE AND BROMIDE COMPLEXES

[75] Inventor: James A. Brennan, Cherry Hill, N.J.

[73] Assignee: Mobil Oil Corporation, New York, N.Y.

[22] Filed: May 27, 1970

[21] Appl. No.: 41,709

Related U.S. Application Data

[63] Continuation of Ser. No. 745,415, July 17, 1968, abandoned, which is a continuation-in-part of Ser. No. 598,564, Oct. 17, 1966, abandoned, which is a continuation-in-part of Ser. No. 334,394, Dec. 30, 1963, abandoned.

[52] U.S. Cl. .......260/683.15 B, 252/429 R, 252/442
[51] Int. Cl. ................................................C07c 3/18
[58] Field of Search ...260/683.15 B; 252/442, 429 R

[56] References Cited
UNITED STATES PATENTS 2,368,653  2/1945  Francis..........................260/683.53
3,029,253  4/1962  Wheeler et al. ..................252/429 X

FOREIGN PATENTS OR APPLICATIONS 1,433,373  2/1966  France ..........................260/683.15

Primary Examiner—Paul M. Coughlan, Jr.
Attorney—Oswald G. Hayes

[57] ABSTRACT

Solutions of aluminum chloride or aluminum bromide, in molar excess, in methyl, ethyl, and propyl esters of $C_3$–$C_{10}$ normal alkanoic acids, having a total of at least five carbon atoms, remain stable for at least 3 days. These solutions are useful catalysts for reactions, such as olefin polymerization and can be recovered and recycled.

3 Claims, 1 Drawing Figure

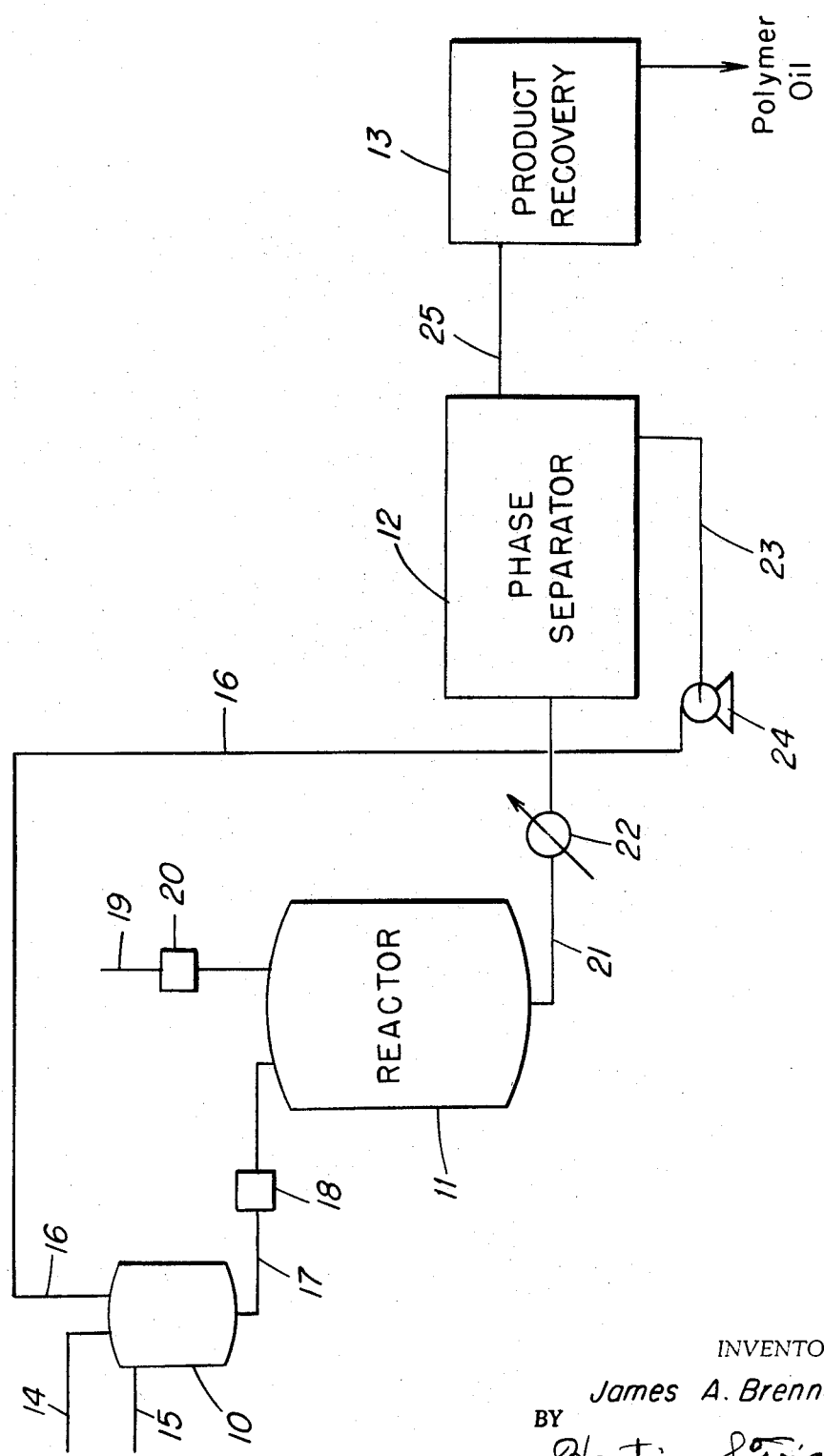

RECYCLABLE LIQUID ALUMINUM CHLORIDE AND BROMIDE COMPLEXES

REFERENCES TO RELATED APPLICATIONS

This application is a continuation of application Ser. No. 745,415, filed July 17, 1968, now abandoned, which is a continuation-in-part of application Ser. No. 598,564, filed Oct. 17, 1966, now abandoned which in turn is a continuation-in-part of application Ser. No. 334,394, filed Dec. 30, 1963, now abandoned.

BACKGROUND OF THE INVENTION

1. Field of the Invention

This invention relates to catalysts for polymerization, alkylation, isomerization, and similar reactions. It is more particularly concerned with a liquid aluminum halide catalyst that effects excellent control, uniformity, and reproducibility in reactions catalyzed by aluminum chloride, and which remains stable and liquid over long periods of time.

2. Description of the Prior Art

As is well known to those familiar with the art, aluminum halides, particularly aluminum chloride and bromide, have been proposed as catalysts in many reactions, including polymerization, alkylation, and isomerization. As aluminum chloride (also aluminum bromide) is a solid, whereas the reactants are liquids, it has been difficult to control reactions and to obtain reproducible results. For example, the polymerization of olefins has been carried out by several methods, each of which has disadvantages: (1) All the olefin is added to the catalyst, resulting in an uncontrollable exothermic reaction. (2) The olefin is added slowly to the catalyst, which means that the catalyst concentration varies during the run. This adversely affects reproducibility. (3) The catalyst and olefin are metered separately, in the proper proportions, into the reaction vessel. Problems of metering solid material, however, make it difficult to maintain desired proportions of catalyst and olefin. Another disadvantage, common to all such procedures, is the difficulty inherent in obtaining uniform contact between solid catalyst and liquid olefin.

If, on the other hand, both the catalyst and reactants are liquid, uniform contact is attained and accurate metering is readily accomplished. Thus, the difficulties encountered in the use of solid aluminum chloride or bromide could be substantially eliminated, if the aluminum chloride or bromide could be obtained in a catalytically-active, liquid form. It has been proposed to dissolve (or complex) aluminum chloride in various solvents, such as alcohols, ethers, and methyl acetate. In each case, however, less than one mole of aluminum chloride was dissolved per mole of solvent. Such molar ratio solutions were not catalytically active.

In application Ser. No. 334,394, it was generally disclosed that catalyst solutions containing more than one mole of an aluminum halide dissolved in certain esters could be used to polymerize olefins and that such solutions could be recycled to subsequent runs. More particularly, my said prior application discloses the ester solvent to be employed as follows: "The solvent used to make the catalyst solution of this invention is a normally liquid aliphatic ester of a fatty acid, which ester must contain a total of at least 4 carbon atoms per molecule. Generally, the liquid ester can contain up to about 22 carbon atoms, but normally liquid aliphatic esters containing a total of between about 4 carbon atoms and about 15 carbon atoms are preferred. It is recognized that some esters having a total carbon atom content within the aforedescribed ranges will be solids at normal room temperatures (20–25° C), and thus outside the scope of this invention. The properties of fatty acid esters, however, are well known and readily available to those skilled in the art. For example, an extensive tabulation of esters and their properties is set forth in Volume 5, pages 826–830 inclusive, of Kirk-Othmer "Encyclopedia of Chemical Technology," Interscience Encyclopedia, Inc. (1950). Reference should be made thereto for examples of typical fatty acid esters melting at 25° C. or lower that fall within the scope of this invention. Typical esters contemplated are ethyl acetate (preferred), ethyl proprionate, methyl caprylate, ethyl palmitate, and butyl oleate." It has also been proposed to isomerize n-pentane using $AlCl_3$ dissolved in ethyl acetate, decanting reaction product and re-using the catalyst solution in subsequent runs [Ind. & Eng. Chem., 42, 342 (1950)]. In both the aforementioned polymerization and isomerization recycling runs, the solvent was ethyl acetate and all runs were carried out within 24 hours.

It has now been found, as a result of pilot plant runs, that at temperatures of 20°–25° C. the $AlCl_3$-ethyl acetate catalyst solution decomposed within 24–30 hours, with the evolution of HCl, to a hard solid. Hence, the catalyst "solution," as previously anticipated, was not recyclable over prolonged periods of several days or months. In application Ser. No. 598,564, it was disclosed that of many ester solvents for aluminum halides, ethyl propionate was the only ester found so far, which maintains the aluminum halide in liquid solution for prolonged periods, i.e., more than two days and up to a month or more. Subsequently, other useful esters have been found.

SUMMARY OF THE INVENTION

In general, this invention provides a stable liquid aluminum halide catalyst for catalyzing reactions normally catalyzed by aluminum chloride or aluminum bromide and which has a catalytic activity similar to that of aluminum chloride or bromide alone, that comprises an ester having the formula, RCOOR', wherein R is normal alkyl ($C_2$–$C_9$), R' is methyl, ethyl, or normal propyl, and R+R' totals at least 4, having dissolved therein aluminum chloride or aluminum bromide in an amount greater than one mole per mole of said ester.

This invention also provides a method for carrying out a reaction catalyzed by aluminum chloride or bromide that comprises carrying out said reaction in a reaction vessel, under reaction conditions, in the presence of a catalyst solution comprising aluminum chloride or bromide dissolved in the aforedefined ester in an amount greater than one mole per mole of said ester; separating from the effluent from said reaction vessel said catalyst solution; and recycling it to the reaction vessel, preferably, with make-up aluminum halide.

BRIEF DESCRIPTION OF THE DRAWING

The drawing presents a schematic flow sheet for carrying out, in accord with this invention, continuous reactions, such as the polymerization of olefins to liquid products.

DESCRIPTION OF SPECIFIC EMBODIMENTS

The catalyst of this invention is a solution or complex of an aluminum chloride or bromide in the aforedefined ester. The solution contains more than one mole aluminum chloride or bromide per mole of ester. In general, the amount of aluminum chloride or bromide dissolved per mole of ester will be between about 1.1 moles and about 1.7 moles. A 1:1 mole solution has little or no catalytic activity. The aluminum chloride or bromide in excess of one mole in the solution appears to be the component that imparts catalytic activity to the catalyst solution. Thus, the amount of solution employed to catalyze the reaction will be governed only by the need to provide sufficient excess (over one mole) aluminum chloride or bromide to catalyze the desired reaction that is ordinarily catalyzed by solid aluminum halide.

The solution of aluminum chloride or bromide in ester is formed readily. A 1:1 mole solution or complex readily forms at room temperature. This solution is capable of dissolving additional aluminum chloride or bromide at temperatures of 30°–50° C. In order to avoid hydrolysis due to moisture, it is preferred to prepare the catalyst solution in a dry inert atmosphere, such as nitrogen or dry air.

The solvent ester, in accordance with this invention, has the formula, RCOOR', wherein R is normal alkyl ($C_2-C_9$), R' is methyl, ethyl, or normal propyl. It is essential that the sum of R+R' be at least four, i.e., that the ester contain at least five carbon atoms. Thus, methyl propionate (four carbon atoms) did not form a stable catalyst solution, but became solid. The esters contemplated are ethyl propionate and n-propyl propionate, and methyl-, ethyl-, and n-propyl n-butyrate, valerate, n-hexanoate, n-heptanoate, n-octanoate, n-nonanoate, and n-decanoate.

As indicated hereinbefore, the catalyst solution of this invention is utilizable to catalyze any reaction ordinarily catalyzed by solid aluminum chloride or bromide. Such reactions and their operating conditions are well known in the art. They include alkylation of aromatic compounds with olefins or aliphatic halides; hydration of olefins, and isomerization of paraffins.

Of particular interest is the continuous, with catalyst recycle, polymerization of olefins to liquid polymers, useful as synthetic lubricants, over prolonged periods. This invention will be illustrated in connection with this polymerization. A wide variety of olefins can be polymerized with the stable catalyst solution of this invention. In general, they can contain between about two and about 25 carbon atoms per molecule and can be straight chain or branched chain, with or without aromatic ring substituents. Although preferred olefins are the 1-olefins, olefins having internal double bonds are contemplated. The olefin reactant can be a single olefin or a mixture of olefins, of which the following are non-limiting examples: ethylene; butene-1; isobutene; hexene; octene-2; 2-ethylhexene-1; decene-2; decene-1; undecene-1; dodecene-1; hexadecene-1; octadecene-1; octadecene-9; eicosene; tricosene-1; tetracosene-1; and triacontene-1.

The polymerization is carried out at temperatures of between about 0° C. and about 100° C. for a period of time of about 1–3 hours. Ordinarily it is carried out at substantially atmospheric pressure, but particularly with lower olefins, superatmospheric pressures sufficient to maintain liquid phase can be advantageously employed. The amount of catalyst employed will generally be about 1–5 percent, by weight of olefin, based on excess aluminum chloride. In preferred operation, in order to render polymer products less viscous and more readily handled, a solvent inert to the polymerization can be used. Suitable solvents include kerosene and paraffins, such as heptane, octane, isooctane, decane, etc.

Because the catalyst solution of this invention is a heavy liquid, the effluent from the reactor is heated to a temperature of below the boiling point of the solvent used (80°–100° C. with kerosene) and permitted to stand quietly for several hours. The major amount of the catalyst solution will separate as a lower heavy layer. This layer is recycled, with fresh aluminum chloride as needed. Then, the remaining polymer product can be washed free of any residual catalyst solution, dried, and freed of solvent and monomer by distillation means. This is illustrated in the attached drawing of a typical continuous operation of this invention.

In the attached drawing, there are shown schematically a catalyst preparation vessel 10, a polymerization reactor 11, a phase separation zone 12, and a product recovery zone 13. In operation, aluminum chloride or bromide through a line 14, and solvent tester through a line 15, are introduced into the catalyst preparation vessel 10, together with recycle catalyst solution from a line 16 (described more fully hereinafter). The amounts of aluminum chloride or bromide, ester, and recycle solution are controlled to maintain a molar excess of aluminum chloride or bromide in the catalyst preparation vessel, relative to the moles ester. After full recycle operation has been effected, the amounts of aluminum chloride or bromide and ester introduced through lines 14 and 15 will be make-up quantities just sufficient to maintain the desired molar excess of aluminum chloride or bromide and the total amount of catalyst needed to maintain the polymerization reaction.

The catalyst solution prepared in the catalyst preparation vessel 10 is passed through a line 17 and metered by a fluid flow metering device 18 into the polymerization reactor 11. Liquid olefin, preferably dissolved in a solvent, is passed into the reactor 11 through a line 19, metered by a fluid flow metering device 20. The metered flow rates of catalyst and olefin are regulated to introduce the catalyst and olefin in the desired proportions to effect polymerization. Preferably, the olefin will be introduced at or near the desired polymerization temperature, i.e., between about 0° C. and about 100° C. The temperature within the polymerization reactor 11 is maintained at the desired polymerization temperature by any well-known means of maintaining substantially constant temperature in an exothermic reaction.

An effluent, comprising unreacted olefin, polymer oil, solvent (if used), and catalyst solution, is withdrawn from the reactor 11 and passed through a line 21 into the phase separation zone 12. Preferably, the effluent is heated in a suitable heating device 22 to a temperature below the boiling point of the solvent used. In the phase separation zone 12, the effluent separates into two layers. The lower layer will be substantially catalyst solution. This solution is withdrawn through a line 23 and pumped by a pump 24 into line 16 and recycled to the catalyst preparation zone 10. There, as described hereinbefore, it is admixed with make-up aluminum chloride or bromide and ester to recommence the cycle.

The upper layer in the phase separation zone 12 contains unreacted olefin, polymer oil, solvent (if used), and possible traces of catalyst solution. It is removed through line 25 and passed into the product recovery zone 13. In this zone (not shown in detail) the upper layer is washed to remove catalyst residue, dried, and solvent, olefin monomer, and polymer products are separated as described hereinbefore. Olefin monomer and solvent can be recycled to the polymerization reactor 11.

The following examples illustrate the catalyst of this invention and demonstrate the feasibility of recycling used catalyst solution.

EXAMPLE 1

A solution (1) was prepared by dissolving anhydrous aluminum chloride in ethyl propionate at room temperature, in a molar proportion, respectively, of 1.31:1. A week later, a solution (2) was prepared by dissolving 100 g. of decene-1 in 50 ml. isooctane and the solution (2) was heated to 50° C. Solution (1) (16.7 g.) and solution (2) were metered over a 54 minute period, into a flask fitted with stirrer, thermometer, and reflux condenser, the mixture in the flask being maintained at 50°–56 C. After addition of the solutions were complete, the mixture was maintained at 50°–56° C. for an additional hour.

Product work-up was as follows: The reaction mixture was contacted with 50 ml. of a 10 percent aqueous solution of HCl and the acid solution was separated and removed in a separatory funnel. Then the reaction mixture was washed (with intermediate phase separation and removal) with 100 ml. water, 125 ml. of 10 percent aqueous $Na_2CO_3$ solution, and then with water until neutral. The product was dried over $Na_2SO_4$ and solvent and monomer were removed by distillation. The yield of polymer oil was >90 g. or >90 percent. It had a K.V. (Kinematic Viscosity) of 29.36cs. at 210° F. and of 290.9cs. at 100° F.

EXAMPLE 2

A large batch of catalyst solution was prepared by dissolving $AlCl_3$ in ethyl propionate in a molar ratio of 1.31:1, respectively. In order to facilitate solution, the ethyl propionate was heated slightly above room temperature with agitation. This completely liquid solution was stored in a dry air atmosphere.

EXAMPLE 2A

Five days after the large batch solution was prepared, a portion was used to polymerize decene-1, using the method of polymerization and product work-up described in Example 1, at 50°–56° C. Yield was >90 percent and the product oil had a K.V. of 33.16 cs. at 210° F. and of 347.3 cs. at 100° F.

EXAMPLE 2B

Eight days after the large batch solution was prepared, a run was made at 51°–53° C. using the proportions of catalyst solution, decene-1, and isooctane as described in Example 1, up to work-up. Instead of washing the reaction mixture, it was placed in a separatory funnel, heated to 85° C., and maintained at that temperature while standing quietly for about 2 hours. A used catalyst solution ("sludge") separated as a lower layer and was withdrawn. This was stored under dry air and used in subsequent runs. The polymer oil product was washed and dried. It (>90 percent yield) and had a K.V. of 37.72cs. at 210° F. and of 410.2cs. at 100° F.

EXAMPLE 2C

Three weeks after the large batch solution was prepared, a portion of it (still liquid) was used in a run at 51°–54° C.; using the proportions, procedure, and work-up described in Example 1. The product (>90 percent yield) had a K.V. of 37.72cs. at 210° F. and 410.2cs. at 100° F.

EXAMPLE 3

On the same day as the run of Example 2B, a portion of the sludge from the run was used in a run to polymerize decene-1. It was found that the sludge was about a 1:1 molar solution of $AlCl_3$ in ethyl propionate. Accordingly, 0.31 mole make-up $AlCl_3$ was added per mole ethyl propionate and dissolved. The resultant catalyst solution was used to polymerize decene-1, as described in Example 1. The product polymer (>90 percent yeild) had a K.V. of 47.48cs. at 210° F. and of 548.0cs. at 100° F.

EXAMPLE 4

One week after the run of Example 2B, a run was made using (liquid) sludge from Example 2B. The prodecure used was as described in Example 3. The product polymer had a K.V. of 40.77cs. at 210° F. and of 452.8cs. at 100° F. Yield was >90 percent.

EXAMPLE 5

Seventeen and seven tenths grams (0.066 mole) of anhydrous aluminum bromide was dissolved in 5.82 g. (0.057 mole) of ethyl propionate (P–32657–1). A 20.4 g. portion of the above solution and 87 g. (0.62 mole) of 1-decene were metered separately and simultaneously during 78 minutes into a flask fitted with addition tubes, stirred, thermometer, and condenser and maintained at 30° C. After all components were added, the mixture was held at 30° C. for 1 hour. The reaction was stopped by pouring onto a mixture of ice and hydrochloric acid. It was transferred to a separatory funnel, washed with a 100 ml. portion of water, with 100 ml. of 5 percent sodium bicarbonate, with water until neutral and then dried over anhydrous sodium sulfate. The monomer and dimer were removed by distillation at reduced pressure to yield 20.5 g. (23.6 percent) of a trimer plus oil of the following physical properties:

KV at 210°F., cs.                 26.4

| | |
|---|---|
| KV at 100°F., cs. | 238.2 |
| Viscosity Index, Method D-2270 | 152 |
| M.W. | 1267 |

EXAMPLE 6

Thirty-five and four tenths grams (0.132 mole) of anhydrous aluminum bromide were dissolved in 11.6 g. (0.113 mole) ethyl propionate. A portion of this solution was stored at room temperature in a dry atmosphere.

After 5 days storage, a polymerization was carried out as described in Example 5, using 23.52 g. of the stored solution (still liquid) and 100 g. (0.705 mole) of decene-1. There was obtained 76.7 g. (76.7 percent) of a trimer plus oil having the following properties:

| | |
|---|---|
| KV at 210°F., cs. | 32.3 |
| KV at 100°F., cs. | 311.4 |
| Viscosity Index | 153 |

From the foregoing examples, it will be apparent that the catalyst solutions of this invention remains liquid and active for long periods of time after it is prepared. Further, the sludge can be re-used successfully even up to a week later.

As was indicated hereinbefore, esters other than ethyl propionate were previously found ineffective to maintain AlCl₃ in solution longer than 24–30 hours. This is demonstrated in the following example.

EXAMPLE 7

A series of solutions was prepared by dissolving AlCl₃ in various esters, using slight warming above room temperature when needed, in a molar proportion of 1.32 moles AlCl₃ per mole ester. Each solution (or mixture) was observed at room temperature for physical state, i.e., whether liquid (L), solid (S), liquid + solid (L+S), immediately after addition of AlCl₃, 1 hour later, and 24 hours later. In the case of the sole effective solvent, in the series investigated, ethyl propionate, an observation was made 1 month later. Pertinent data are set forth in Table I.

TABLE I

| | Physical State | | | |
|---|---|---|---|---|
| Ester Solvent | After Addition | 1 Hour | 24 Hours | 1 Month |
| Ethyl formate | L+S | L+S | L+S | |
| Butyl formate | L* | * | | |
| Ethyl acetate | L | L | S | |
| Propyl acetate | L* | L* | L+S | |
| Isopropyl acetate | L* | | | |
| n-Butyl acetate | L | L* | S | |
| Isobutyl acetate | L* | L* | S | |
| sec-Butyl acetate | L* | * | L+S* | |
| n-Pentyl acetate | L* | L* | S | |
| Phenyl acetate | S | | | |
| Benzyl acetate | L±S | L+S | L+S | |
| Phenethyl acetate | L+S | L+S | L+S | |
| Ethyl propionate | L | L | L | L |

\* Strong evidence of decomposition.

Upon further investigation, it has been found that a class of esters besides ethyl propionate is operative to form solutions, as contemplated herein, that are liquid for three days and more. This is illustrated in the following example.

EXAMPLE 8

A series of solutions was perpared by dissolving AlCl₃ in various esters, using slight warming above room temperature where necessary, using a molar ratio of 1.3 moles AlCl₃ per mole ester. Each solution was observed initially, at room temperature, for physical appearance. Those that were liquid were observed periodically. The times set forth in Table II reflect the length of the time period over which each solution was observed and does not indicate that the solution became unstable at that time, as the length of the periods of observation varied.

TABLE II

ACID

| Alcohol | propionate | n-butyrate | Valerate | n-hexanoate | n-octanoate n-nonanoate |
|---|---|---|---|---|---|
| Methyl | Solid | Liquid 90 days | Liquid 20 days | Liquid 17 days | Liquid 30 days |
| Ethyl | Liquid | Liquid 30 days | 3 weeks | | Liquid 2 weeks |
| n-propyl | Liquid 4 days | Liquid 10 days | | | |
| n-Butyl | Insol. | Insol. | | | |
| n-Pentyl | Insol. | Unstable | | | |

From the date in Table II, it will be noted that normal, unbranched esters, as aforedefined, form stable catalyst solutions. Branching in the ester gives poor results. Thus, with methyl isobutyrate a solid formed. With isopropyl propionate, the mixture foamed out of the mixing vessel.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A stable liquid aluminum chloride catalyst solution for catalyzing reactions normally catalyzed by aluminum chloride and which has a catalytic activity similar to that of aluminum chloride alone, that comprises ethyl propionate having dissolved therein aluminum chloride in an amount between about 1.1 moles and about 1.7 moles aluminum chloride per mole ester.

2. A stable liquid aluminum bromide catalyst solution for catalyzing reactions normally catalyzed by aluminum bromide and which has a catalytic activity similar to that of aluminum bromide alone, that comprises ethyl propionate having dissolved therein aluminum bromide in an amount between about 1.1 moles and about 1.7 moles aluminum bromide per mole ester.

3. A method for polymerizing olefins that comprises contacting, in a reaction vessel, said olefins with the catalyst solution defined in claim 1; withdrawing an effluent stream from said reaction vessel; separating said catalyst solution from said effluent; and recycling said catalyst solution to said reaction vessel with make-up aluminum chloride.

* * * * *